(12) United States Patent
MacMullen et al.

(10) Patent No.: US 8,923,130 B2
(45) Date of Patent: Dec. 30, 2014

(54) COMMUNICATION CONTROLLER CONTROLLING FRAME RATE TO PROVIDE FRAME RESPONSE TIME

(71) Applicant: Neul Ltd., Cambridge (GB)

(72) Inventors: Neil MacMullen, Cambridge (GB); William Webb, Cambridge (GB)

(73) Assignee: Neul Ltd., Cambridge (GB)

( * ) Notice: Subject to any disclaimer, the term of this patent is extended or adjusted under 35 U.S.C. 154(b) by 0 days.

(21) Appl. No.: 13/916,955

(22) Filed: Jun. 13, 2013

(65) Prior Publication Data
US 2013/0272204 A1    Oct. 17, 2013

Related U.S. Application Data

(63) Continuation of application No. PCT/EP2012/058191, filed on May 4, 2012.

(30) Foreign Application Priority Data

| Jun. 13, 2011 | (GB) | 1109829.0 |
| Jun. 13, 2011 | (GB) | 1109830.8 |
| Jun. 13, 2011 | (GB) | 1109836.5 |
| Jun. 13, 2011 | (GB) | 1109837.3 |
| Jun. 13, 2011 | (GB) | 1109840.7 |
| Jun. 13, 2011 | (GB) | 1109844.9 |
| Jun. 13, 2011 | (GB) | 1109848.0 |
| Jun. 13, 2011 | (GB) | 1109850.6 |
| Jun. 13, 2011 | (GB) | 1109853.0 |
| Jun. 13, 2011 | (GB) | 1109854.8 |
| Jun. 13, 2011 | (GB) | 1109863.9 |
| Jun. 13, 2011 | (GB) | 1109867.0 |
| Jun. 13, 2011 | (GB) | 1109874.6 |
| Sep. 30, 2011 | (GB) | 1116909.1 |
| Sep. 30, 2011 | (GB) | 1116910.9 |

(51) Int. Cl.
*H04L 1/00* (2006.01)
*H04W 28/06* (2009.01)

(52) U.S. Cl.
CPC ................... *H04W 28/065* (2013.01)
USPC .......................................................... 370/235

(58) Field of Classification Search
None
See application file for complete search history.

(56) References Cited

U.S. PATENT DOCUMENTS 5,189,411 A * 2/1993 Collar et al. .................... 340/7.2
5,515,375 A * 5/1996 DeClerck ........................ 370/468

(Continued)

FOREIGN PATENT DOCUMENTS

| WO | 99/07170 | 2/1999 |
| WO | 2008/056023 A1 | 5/2008 |
| WO | 2009/086050 A1 | 7/2009 |

OTHER PUBLICATIONS

Webb, William, "Weightless, the Technology to Finally Realise the M2M Vision," Mar. 28, 2012, retrieved from http://www.weightless.org/documents/download/ee575c15ed123be7c9e119d52bc48d1d4f73162892123, retrieved on Jun. 20, 2012, 7 pages.

(Continued)

*Primary Examiner* — Yong Zhou
(74) *Attorney, Agent, or Firm* — BainwoodHuang

(57) ABSTRACT

A controller, implemented as a virtual machine, for operating in a communication network, the controller being configured to format data to be transmitted over the network into a series of frames, transfer the formatted data to a radio for transmission over the network, and control the radio to communicate the series of frames at a frame rate that is sufficiently low for there to be a delay of at least one second between data being received over the network by the radio and the controller having to control the radio to transmit a response to that data.

20 Claims, 4 Drawing Sheets

(56) References Cited

U.S. PATENT DOCUMENTS

| | | | |
|---|---|---|---|
| 5,748,147 A * | 5/1998 | Bickley et al. | 342/457 |
| 5,977,881 A * | 11/1999 | Kido | 340/7.27 |
| 6,785,511 B1 * | 8/2004 | Hengeveld et al. | 455/16 |
| 7,151,966 B1 * | 12/2006 | Baier et al. | 700/19 |
| 7,342,897 B1 * | 3/2008 | Nader et al. | 370/255 |
| 2005/0013325 A1 | 1/2005 | Choi et al. | |
| 2006/0013325 A1 | 1/2006 | Agrawal et al. | |
| 2008/0259857 A1 * | 10/2008 | Zheng | 370/329 |

OTHER PUBLICATIONS

Webb, William, "Weightless Technology: An Overview," 2012, 1Mar. 28, 2012, retrieved from http://www.weightless.org/documents/download/ee575c15ed123be7c9e119d52bc48d1d4fr3162892123, retrieved on Jun. 20, 2012, 16 pages.

Xiong et al., "Smart (In-home) Power Scheduling for Demand Response on the Smart Grid," IEEE, 2011, 7 pages.

\* cited by examiner

COMMUNICATION CONTROLLER CONTROLLING FRAME RATE TO PROVIDE FRAME RESPONSE TIME

BACKGROUND

The invention relates to a controller for a communication network.

An example of a structure of (at least part of) a conventional base station is shown in FIG. 1. The base station 101 comprises a network layer 102 and a control layer 103, which controls the operation of a radio 104. The network and control layers are usually implemented in software. The radio is comprised of a layer of embedded firmware 105, a MAC layer 106 and a physical layer 107. The firmware receives data from the control layer which it formats into frames for passing to the MAC. The MAC is suitably implemented as memory-mapped hardware. The MAC may perform the RF modulation that is required before the physical layer transmits the frame over the air interface.

A problem with the structure shown in FIG. 1 is that the embedded firmware has to be written in a low-level programming language, which makes it difficult and time-consuming to program, test and debug. Another problem is that the firmware tends to be machine-specific, so that it cannot be readily transferred from one device to another. This may make it difficult to deploy a large number of base stations in a number of different countries, because the firmware for those base stations will have to be specifically designed for the particular machines that are going to implement them.

A possible solution has been proposed in which the frame is not composed in the radio but elsewhere in the network. The frame is then transmitted over the network to the MAC, which is required to perform only minor formatting before the frame is ready for transmission. An advantage of this approach is that the formatting of the data to be transmitted is largely performed in software. A disadvantage is that the process of receiving and decoding data, processing that data to generate a response, and formatting the response for transmission causes a delay that can be unacceptable in modern networks designed to accommodate fast data rates. Therefore, there is a need for a flexible base station that is configured to be able to cope with the delays that formatting frames in software can cause.

SUMMARY

According to one embodiment of the invention, there is provided a controller, implemented as a virtual machine, for operating in a communication network, the controller being configured to format data to be transmitted over the network into a series of frames, transfer the formatted data to a radio for transmission over the network and control the radio to communicate the series of frames at a frame rate that is sufficiently low for there to be a delay of at least one second between data being received over the network by the radio and the radio having to transmit a response to that data.

The controller may be configured to format the data into a series of frames in which each frame has the same duration.

The controller may be configured to format the data into a series of frames in which the duration of each frame is at least one second.

The controller may be configured to format the data into a series of frames that each have a duration of 2 seconds.

The controller may be configured to control the radio such that it communicates at least one frame between receiving the data and transmitting the response.

The controller may be configured to control the radio in accordance with a protocol for machine-to-machine communications.

The controller may be configured to control the radio in accordance with the Weightless protocol.

The controller may be implemented on a PC.

The controller may be implemented in a .NET Framework.

The controller may be configured to transfer data received over the network by the radio to a computing cloud for processing.

The controller may be configured to receive a response to the received data from the computing cloud and format that response into data to be transmitted over the network by the radio.

The controller may be configured to format data to be transmitted over the network into a series of frames in which each frame comprises a downlink portion for transmissions by radio, said downlink portion comprising a control portion and an uplink portion for transmissions to the radio.

The controller may be configured to control the radio to transmit the control portion of each frame using a relatively low data rate so as to maximize the likelihood of the control portion being successfully received by a terminal operating in the communication network.

The controller may be configured to control the radio to transmit the control portion using the lowest data rate supported by the communication device.

The controller may be configured to communicate with a plurality of terminals via the radio and to control the radio to transmit the control portion of each frame using the lowest data rate required by the plurality of terminals.

The controller may be configured to control the radio to transmit the control portion using the lowest data rate required by all terminals connected to a cell with which the radio is associated.

According to a second embodiment of the invention, there is provided a base station controller configured to control a base station of a communication network, the base station controller comprising a controller as claimed in any of claims 1 to 16.

According to a third embodiment of the invention, there is provided a computer-readable medium encoded with instructions, that when executed by a controller for operating in a communication network, cause the controller to format data to be transmitted over the network into a series of frames, transfer the formatted data to a radio for transmission over the network and control the radio to communicate the series of frames at a frame rate that is sufficiently low for there to be a delay of at least one second between data being received over the network by the radio and the radio having to transmit a response to that data.

According to a fourth embodiment of the invention, there is provided a base station controller implemented as a virtual machine.

BRIEF DESCRIPTION OF THE DRAWINGS

For a better understanding of the present invention, reference is made by way of example to the following figures, in which.

DETAILED DESCRIPTION

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

A controller for a communication network may be implemented as a virtual machine. The controller may be configured to control a radio that transmits and receives data over a communication network. The controller may format data that is to be transmitted over the network into a series of frames. It may pass each frame to the radio for communication over the network.

The controller suitably controls the radio to communicate the series of frames at a frame rate that is low enough for the controller to have time, between the radio receiving a message from a terminal in the network and the radio having to respond to that message, to process the received message, generate a response and format the response into a frame for transmission by the radio. This may be achieved by the controller controlling the radio such that there will always be a delay of at least one second between data being received over the network by the radio and the radio having to transmit a response to that data.

Figure 2:
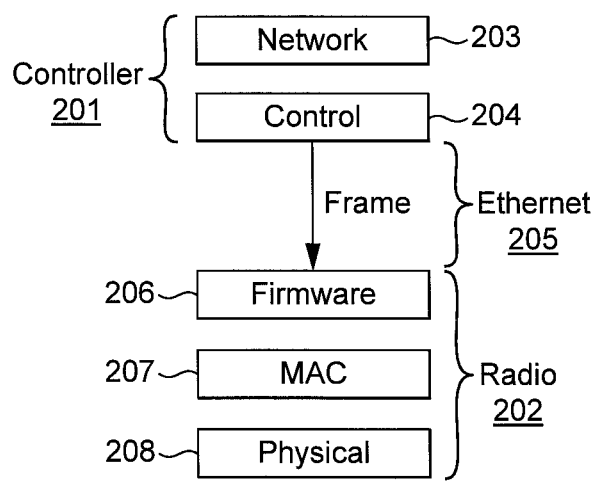
FIG. 2 shows an example of the structure of a radio and its associated controller.

An example of the structure of such a controller, together with its associated radio, is shown in FIG. 2. The controller (or at least part of it) is shown at 201. The controller comprises a network layer 203 and a control layer 204, both of which are implemented in software. The control layer is configured to format the data to be transmitted over the network into frames. The frames are suitably entire frames, including control and header information. These frames may then be passed, e.g. via an Ethernet connection, to the radio 202. The radio comprises a thin layer of embedded firmware 206 for presenting the formatted data to the MAC 207 and a physical layer 208 for transmitting signals over the air interface. The radio, in this embodiment, might be considered to represent a base station, while the controller might be considered to represent a base station controller.

The arrangement illustrated in FIG. 2 differs from a typical modem architecture in which the data and control planes are treated as two very separate interfaces. A typical modem has a lot of intelligence in the embedded firmware. By moving this intelligence up into the control layer, the process of programming and debugging the software is simplified considerably since it is possible to implement the control layer in a higher-level programming language than that which would be used to program firmware. Abstracting many of the communication functions from the physical layer also enables enhanced testing to be performed. Finally, moving more of the intelligence into the software renders the controller easily transferable to different physical devices. Essentially, the result is an architecture in which a simple physical device acts as the "base station" in the conventional sense, by transmitting and receiving signals over the air interface. The operation of the "base station" is controlled by a controller that can be implemented as software that is readily transferable from one processing machine to another.

There are no strict boundaries between "firmware" and "software". However, firmware is generally considered to be software that cannot be changed without also making some changes to the underlying hardware. Firmware is typically used to perform basic, low-level operations. The term is often used to contrast with higher-level "software", which can be changed without replacing any hardware components.

The part of the apparatus illustrated in FIG. 2 that controls the communication process might be implemented by a PC. The PC may act as the processing element for composing the frames. The radio might be implemented by a modem. The PC might be connected to a modem over an Ethernet connection. The controller may be implemented as a virtual machine running on the PC, so that it can be moved to a new machine without having to be adapted to the particular physical attributes of that machine. Suitably the controller is implemented using the .NET Framework, although any high-level language and development environment might be used.

The controller may be optionally configured to pass some or all of the data it receives from the radio to a computing cloud for further processing. The controller may use the cloud for any or all of computation, software, data access and data storage services. The controller may make use of a public cloud, a community cloud, a private cloud or any combination of these. Suitably the "cloud" may be provided by a collection of servers comprised in a core of the communication network. Using the cloud may be beneficial because it may give the controller access to computing services that extend beyond its own capabilities. This allows the controller to be implemented in a widely-available and reasonably-priced processing machine such as a PC. The cloud may also provide a means for data to be transferred between the controller and the core network. However, performing some or all of the processing via cloud computing may sometimes introduce additional, and often random, delay. Therefore, another advantage of slowing the frame rate down so that there is a sufficiently long gap between receipt of a message and its response is to give the controller the flexibility it needs to make use of cloud computing.

Figure 3A:
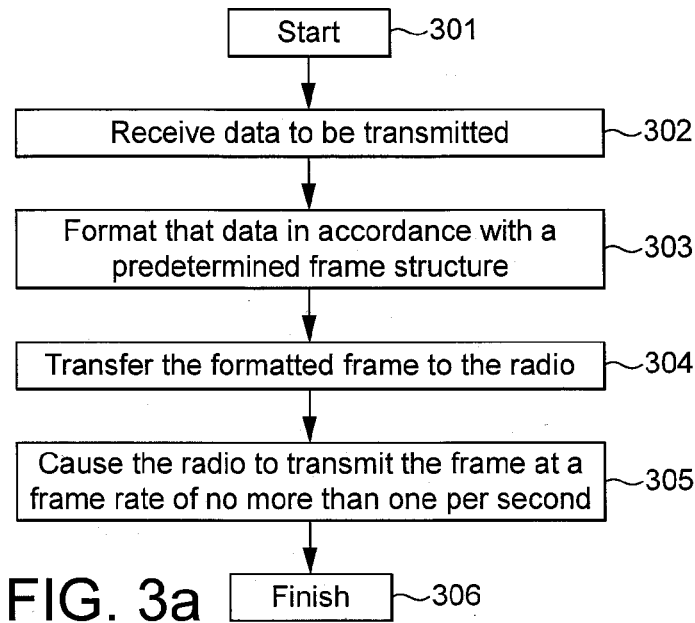
FIGS. 3a and 3b show examples of processes that may be performed by the radio and its associated controller.

An example of a process that may be performed by the controller is shown in FIG. 3a. The process starts in step 301. In step 302, the controller either receives or generates data that should be transmitted over the air interface. The controller formats that data in accordance with a predetermined frame structure (step 303). The controller transfers that formatted frame to the radio (step 304) and causes the radio (via either a direct or indirect control mechanism) to transmit the frame so that the frame rate is no higher than one frame per second (step 305). The process terminates in step 306.

Figure 3B:
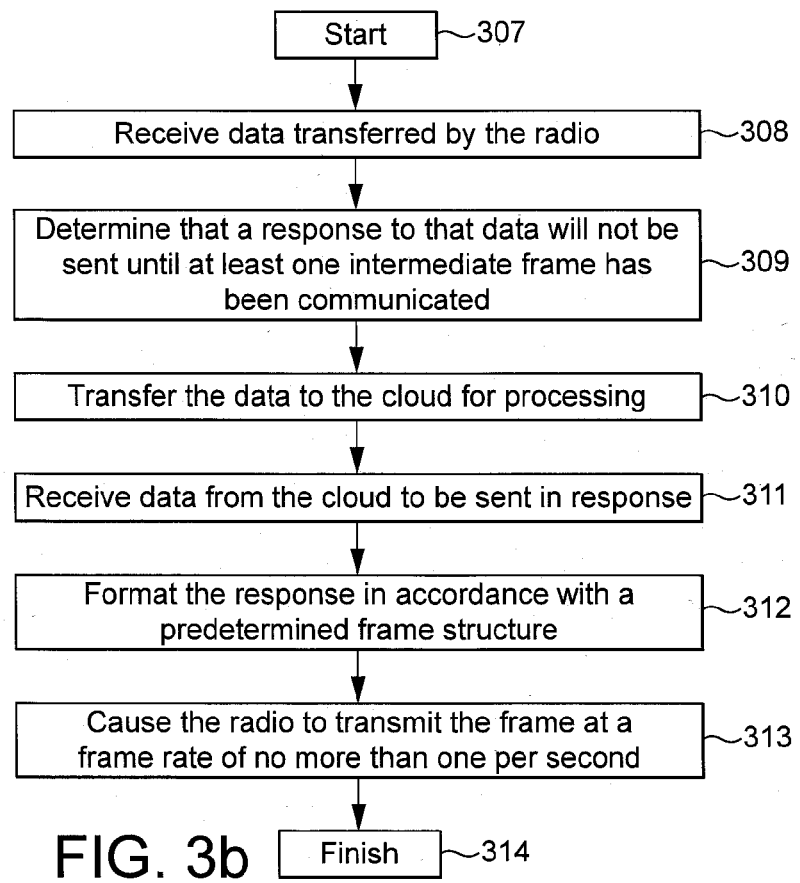

An example of another process that may be performed by the controller is shown in FIG. 3b. The process starts in step 307. In step 308 the controller receives data transferred to it by the radio. This data is received by the radio as part of a signal received over the air interface. The controller determines that a response to this data should not be sent for at least one second. One way of ensuring this is for the controller to defer the response so that there is always at least a one frame gap between receiving a message and sending a response (step 309). In this example, the controller passes the data (possibly after some processing in the controller) to a computing cloud for further processing. The controller may receive information to be sent as part of a response to the original data from the cloud (step 311) and format that data in accordance with a predetermined frame structure (step 312). The controller also controls the radio to transmit the frame so that the frame rate is no higher than one frame per second (step 313).

Having delay of at least one second between a terminal sending a message to the base station and getting a response is unlikely to be acceptable in most modern communication networks. However, the delay may be acceptable if the network is configured to operate in a part of the frequency spectrum in which the available bandwidth is limited and variable. Such a network would, in any event, have to be designed to cope with delays and breaks in communication and so is likely to be able to accommodate any delay caused by shifting the formatting of the frames from firmware to software. A network of this kind is unlikely to be suitable for communications in which there is some human interaction. However, it may be suitable for a machine-to-machine network.

An example of a communications network in which the controller may be configured to operate will now be described in detail. This description frequently makes reference to a "base station" and the functions it performs in the network. A base station in accordance with one or more embodiments of the invention may be a relatively simple device, such as a modem, that acts predominantly under the control of a "controller" such as a virtual machine running on a PC. Therefore, when the following description makes reference to a "base station" being configured to perform certain functions, it should be understood that in one or more embodiments of the invention it may be the "controller" that actually performs and/or controls those functions. In other words, it should be understood that where the description makes reference to the "base station" being configured to perform certain functions, the controller is also configured to perform those functions.

A wireless network may be configured to operate without having been specifically allocated any part of the electromagnetic spectrum. Such a network may be permitted to operate in so-called whitespace: a part of the spectrum that is made available for unlicensed or opportunistic access. Typically whitespace is found in the UHF TV band and spans 450 MHz to 800 MHz, depending on the country. A large amount of spectrum has been made available for unlicensed wireless systems in this frequency range.

A problem with operating in whitespace is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in the whitespace must reference a database that determines which channels may be used in any given location. This is intended to avoid interference with the TV transmissions and certain other incumbent systems such as wireless microphones.

The whitespace database does not include information about every possible source of interference. For example, a television transmitter may be intended to broadcast to only a particular coverage area, but may in fact leak into nearby areas in which the frequencies being used by that transmitter appear, at least from the whitespace database, to be available for unlicensed use. Transmissions from major TV stations can in fact be well above the thermal noise at distances of 100 km from the station. Although the signal from such a transmitter may not be strong enough to be reliably received by television antennas in nearby areas, it is often strong enough to cause severe interference to a whitespace network operating in those areas. This interference may affect base stations especially, particularly if they have elevated antennas (which many have in order to increase their coverage area). On nominally free channels, reception is more likely to be dominated by distant TV broadcasts than thermal noise, especially in rural regions. This interference can render many of the whitespace channels unusable or severely compromised.

Further sources of interference may include: spurious emissions from nearby TV transmitters; devices operating in other wireless networks, such as Wi-Fi devices, wireless microphones, and other unlicensed users operating in whitespace; and unintended emissions of devices that are not part of a wireless network, e.g. spurious emissions from faulty electric drills.

Another problem with the database system is that increased sun spot activity tends to create abnormal propagation conditions at UHF. These abnormal propagation conditions may render some of the information in the database irrelevant, so that the database approach becomes decreasingly robust.

Often interference is localized, so that while the ability of some terminals to receive information on one or more frequencies is negatively impacted, the other terminals in a cell may be unaffected. Terminals attached to the same base station may therefore have different communication capabilities due to extrinsic factors. In addition, some of the terminals may have intrinsically different communication capabilities due to their physical attributes like antenna type, circuitry etc. This is particularly true in machine-to-machine networks, which may be formed of cells covering a large geographical area and comprising a large number of different devices.

Another problem faced in the implementation of communication networks, particularly wireless networks, is that terminals often have power constraints. For example mobile terminals are commonly battery powered, and not all fixed terminals have easy access to a mains electricity supply, for example due to being located in remote or inaccessible places. A way of improving power efficiency in a terminal is for it to enter a low power "sleep" mode whenever it is not actively engaged in communication. However this creates a new problem if the terminal is required to rapidly "wake up" and begin communicating at an unscheduled time since it takes time to come out of sleep mode and acquire or re-engage with a network. A terminal will typically be required to receive and interpret some control information transmitted by a base station or access point before it can commence communication over a network.

Figure 4:
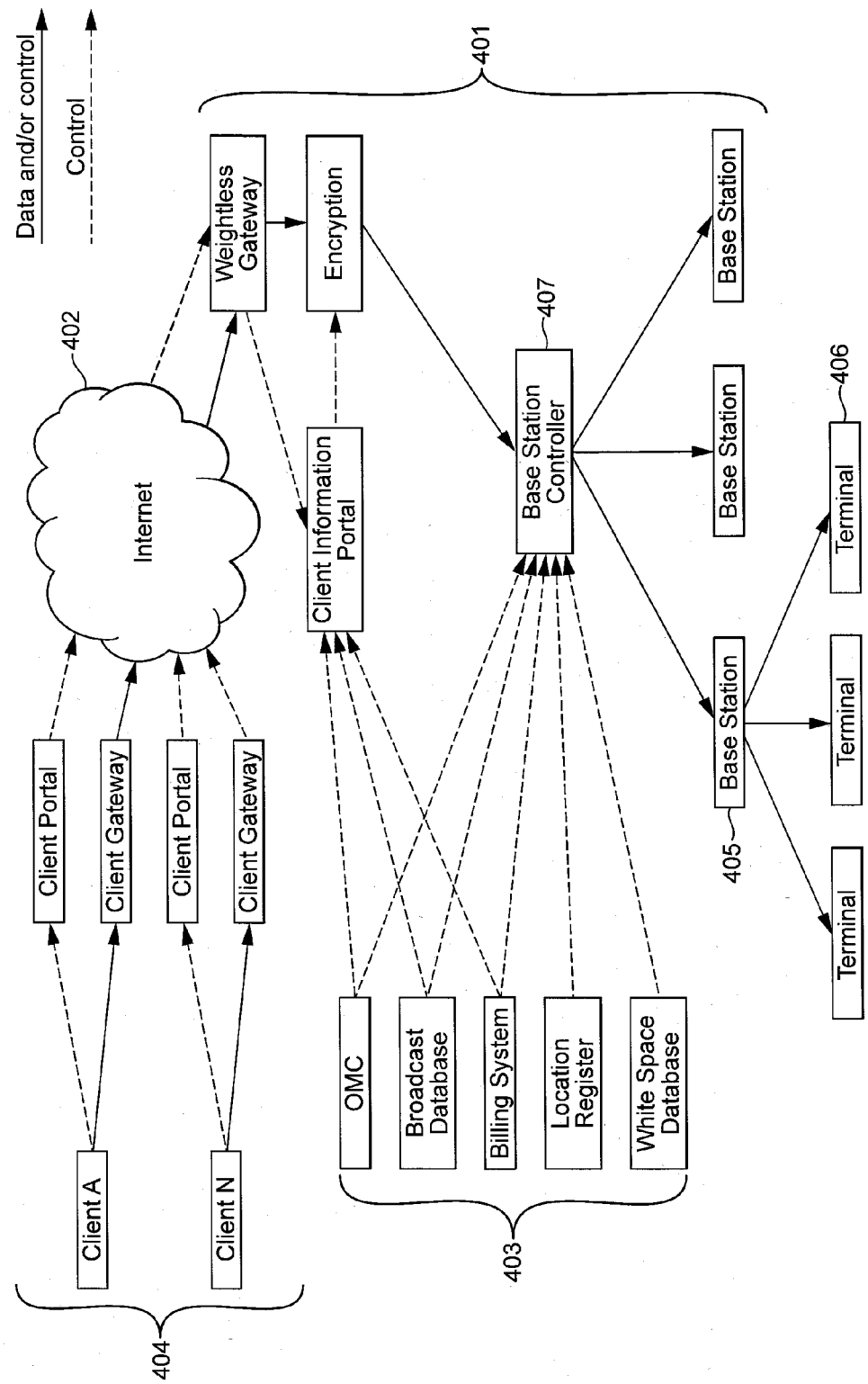
FIG. 4 shows an example of a communication network.

An example of a wireless network is shown in FIG. 4. The network, shown generally at 401, comprises one or more base stations 405 that are each capable of communicating wirelessly with a number of terminals 406. Each base station may be arranged to communicate with terminals that are located within a particular geographical area or cell. The base stations transmit to and receive radio signals from the terminals. The terminals are suitably entities embedded in machines or similar that communicate with the base stations. Suitably the wireless network is arranged to operate in a master-slave mode where the base station is the master and the terminals are the slaves.

A base station controller 407 may control one or more base stations. The base station controller may provide a single point of communication for multiple base stations and distribute the information received to other network elements as required. That is, the network may be based around a many-to-one communication model. The core network 403 may be arranged to communicate with a client-facing portion 404 via the internet 402. In this way a client may provide services to the terminals via the wireless network.

The base station controllers may provide the information to be transmitted to the base stations in pre-formatted frames. The base stations may be relatively simple devices that take pre-formatted frames of information and transmit them.

Other logical network elements shown in this example are:
Core network. This routes traffic information between base stations and client networks.
Billing system. This records utilization levels and generates appropriate billing data.
Authentication system. This holds terminal and base station authentication information.
Location register. This retains the last known location of the terminals.
Broadcast register. This retains information on group membership and can be used to store and process acknowledgements to broadcast messages.
Operations and maintenance center (OMC). This monitors the function of the network and raises alarms when errors are detected. It also manages frequency and code planning, load balancing and other operational aspects of the network.
Whitespace database. This provides information on the available whitespace spectrum.
Client information portal. This allows clients to determine data such as the status of associated terminals, levels of traffic etc.

In practice, many of the logical network elements may be implemented as databases running software and can be provided on a wide range of platforms. A number of network elements may be physically located within the same platform.

A network such as that shown in FIG. 4 may be used for machine-to-machine communications, i.e. communications that do not involve human interaction. Machine-to-machine communications are well-matched to the limitations of operating in whitespace, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions. Services can be provided not in real time; low latency is not important as long as data is reliably delivered.

The network preferably employs frequency hopping as a tool for both avoiding interferers and for avoiding causing interference to other users. Frequency hopping may advantageously:
Minimize the interference to TV reception since no downlink will be permanently causing interference to any given TV receiver.
Reduce the probability of the terminal being in a long-term fade (lasting multiple frames) and hence provide a form of interleaving that enables more efficient error correction to be used.

A suitable hopping rate for the downlink channels may be the frame rate, so that each frame is transmitted on a different frequency from the preceding frame. The frames for a network designed to operate in whitespace for machine-to-machine communication may be particularly long. Suitably, each frame has a duration of at least one second. In one example the frames may each be 2 seconds long, giving a frequency hop on the downlink every 2 seconds (which is 30 hops per minute). Frequency hopping sequences may be coordinated over neighboring base stations to try to minimize instances in which neighboring base stations are transmitting on the same frequency. One straightforward option is for base stations to use the group of available frequencies in either ascending or descending order, with each base station applying a different offset to the sequence and so commencing its respective sequence on a different frequency from other base stations.

Where the frames are 2 seconds long, the delay between receipt and response may be increased to at least 2 seconds by leaving a gap of at least one frame between receiving a message and transmitting a response.

Figure 5:
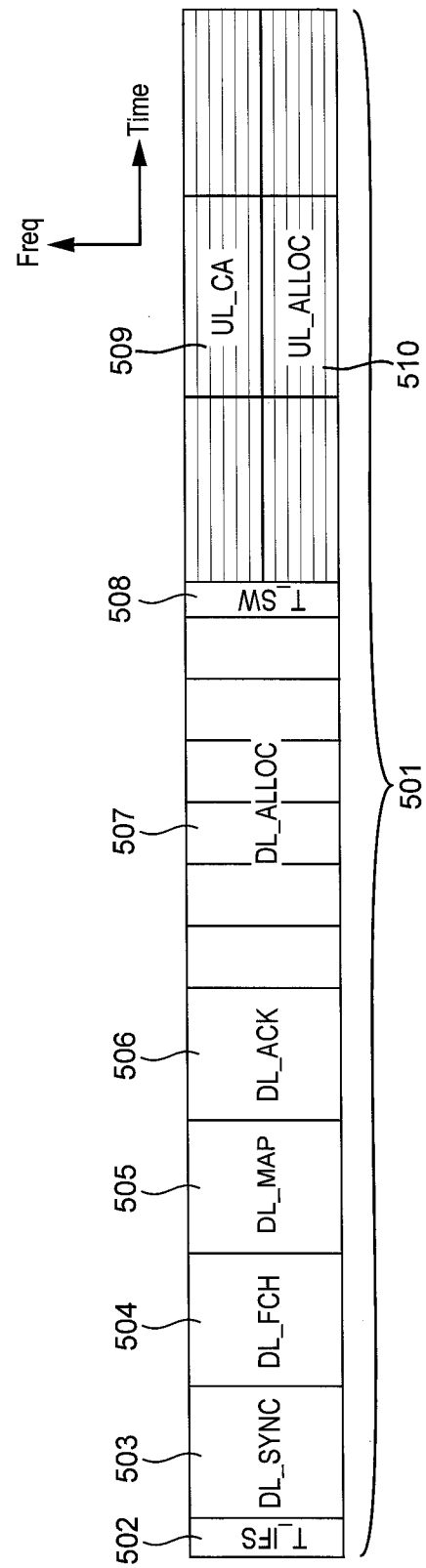
FIG. 5 shows an example of a communication frame.

In one embodiment, the network may use medium access control (MAC) to share the same radio resource between multiple terminals. An example of a suitable frame structure is shown in FIG. 5. The frame (shown generally at 501) comprises time to ramp-up to full output power 502 (T_IFS), a synchronization burst 503 (DL_SYNC), an information field providing the subsequent channel structure 504 (DL_FCH), a map of which information is intended for which terminal 505 (DL_MAP), a field to allow acknowledgement of previous uplink transmissions 506 (DL_ACK) and then the actual information to be sent to terminals 507 (DL_ALLOC). There is then a guard period for ramp-down of the downlink and ramp-up on the uplink 508 (T_SW), followed by the allocated uplink data transmissions 510 (UL_ALLOC) in parallel with channels set aside for uplink contended access 509 (UL_CA).

Each frame may be broadly divided into control fields, such as DL_SYNC, DL_FCH, DL_MAP and DL_ACK, which impart information to the terminals about the function of the network and the arrangement of the frame, and data fields, such as DL_ALLOC, UL_ALLOC and UL_CA that are used to transfer actual information between the base station and the terminals. Preferably the base station transmits the control fields using a mode that is appropriate for all of the terminals that the frame is intended for, so that (as far as possible) all of the terminals who wish to receive that control information are capable of doing so.

The data rate in the protocol can be variable, but the protocol is capable of supporting a particularly low minimum data rate. For example, the minimum instantaneous data rate (over the air) can be 100 bits per second or less. This would be inadequate for most applications, but in the case of machine-to-machine communications a data rate of this type is adequate for many purposes and can improve tolerance to interferers.

Preferably, the data rate selected for transmission may be the lowest data rate required by any of the terminals for which the frame is intended or more generally for any of the terminals in the cell, Alternatively the lowest data rate that the base station is capable of transmitting with may be selected. For some cases, the lowest data rate may be achieved by employing the highest spreading factor.

It may be particularly advantageous for one or more of the control fields to be transmitted at the lowest data rate supported by the base station. This will assist all terminals to receive those fields, even those that have not yet attached and for which the base station has no information. The uplink CA slots, on the other hand, may be transmitted using the lowest data rate supported in the cell, or another data rate.

The DL_FCH may include information to enable the terminals to determine the hopping sequence. The DL_FCH may include a list of the frequencies that are included in the sequence. If the frequency hopping sequence is just an ascending/descending sequence, one efficient way of communicating it is by means of a channel map, with a bit being set if the channel is in use in the base station. The DL_FCH may also include a MAC Frame count (16-bit) enabling terminals to determine where the base station is in its hopping pattern. Finally, the DL_FCH may indicate the spreading factor used for transmitting the DL_MAP.

The DL_MAP informs terminals as to whether there is any information for them in the frame and whether they have an uplink slot reserved for them to transmit information. It comprises a table of terminal identities, the number of slots that their information is spread over and the transmission mode and spreading factors used. All terminals monitoring the frame decode this field to determine whether they need to decode subsequent information. The length of the DL_MAP may be included as part of the DL_FCH, as may the spreading factor used to transmit it. The base station may select the spreading factor for the DL_MAP to be that corresponding to the lowest bit rate required by terminals connected to the base station or that corresponding to the lowest bit rate supported by the base station. A terminal can determine the position of its assigned slots from the DL_MAP by adding up the number of slots allocated in prior rows in the table.

On the uplink the slots may be numbered from 0 to n on the first FDMA channel, then on the subsequent FDMA channel and so on. The terminal can determine how many slots there are each channel from the length of the frame available for the uplink (that remaining after completion of the downlink) divided by the length of each slot. If a terminal has data requiring multiple slots it would normally be given these consecutively on the same carrier as this both simplifies the terminal transmission and minimizes the control information required to describe the slot location. However, it is possible to give the terminal multiple allocations on different carriers (so long as they are not simultaneous) to achieve frequency hopping on the uplink.

The base station may be configured to communicate with one or more terminals in the cell at regular, predetermined intervals. Scheduling communications in this way may be advantageous in machine-to-machine networks, in which the terminals are often devices having small batteries. By scheduling communications at regular, predetermined intervals, terminals can enter a sleep mode between communications and only wake-up when a communication is expected.

Each of the cells into which the network may be divided will typically cover a large geographical area. The number of terminals located within each cell will therefore be large, and different terminals in the same cell will tend to be subjected to different interference conditions as a consequence of their different positions within the cell. Some terminals may be subject to localized interference, e.g. because of an interferer in the terminal's immediate vicinity or because the terminal is located close to a cell boundary. Some terminals may be subject to interference on a particular frequency in the frequency hopping sequence. Any interference will tend to affect a terminals ability to communicate, particularly its reception capability. The terminals may also differ in their ability to communicate as a consequence of differences inherent in their construction (e.g. as a consequence of different receive circuitry, antenna type, antenna height etc.).

Interference from other users that may affect a terminal's ability to communicate includes emissions from licensed users, like signals from far-distant TV transmitters or spurious emissions from nearby TV transmitters. Other sources of potential interference may include devices operating in other wireless networks, such as Wi-Fi devices, wireless microphones, and other unlicensed users operating in whitespace. Interference may also be caused by the unintended emissions of devices that are not part of a wireless network, e.g. spurious emissions from faulty electric drills.

TDMA (time division multiple access) may be used to divide the channel between multiple users. The channel may be divided in time into downlink and uplink elements, so for part of the time the base station will be transmitting on a channel and for the remainder it will be listening on the same channel. The downlink channel will therefore operate for part of the duration of the frame (as shown in FIG. 3), the base station ceasing transmission to enable the terminals to transmit. The time frame for bursts as measured from the start of one downlink transmission to the start of the next is at least 1 second and suitably 2 seconds. The duty cycle may be variable and selected by the base station to best manage the resources on a frame-by-frame basis. In order to keep spurious emissions under control, a ramp-up and ramp-down process is preferably applied to each burst. As an example, 250 μs is may be allowed for this process between the uplink and the downlink, and 150 μs is may be allowed between the downlink and the uplink.

In all modes, the downlink channels may be frequency hopped at a rate of 1 hop per 2 seconds (30 hops per minute) using a pre-defined hopping sequence.

Error correction may be overlaid onto the data transmission at either a rate 3/4 or 1/2 depending on the SNR. Suitable coding methods might be convolutional codes for longer packets and Golay codes for shorter packets.

Scrambling may be added to prevent certain data patterns occurring which might be problematic for the system, such as long strings of 0. The scrambling sequence may be derived from a linear feedback shift register taking as its input the frame number and current channel number. The latter avoids the decoding of channels on different frequencies which have been accidentally translated to the current frequency through image problems within the terminal.

The downlink channels may be designed to fit within TV channels with minimal adjacent channel leakage. The channels may be 8 MHz wide, suitably with a 5 MHz core bandwidth. Filtering may be used to achieve the required roll off (e.g. by using a root-raised cosine with B=0.4). Transmissions may be delivered on a single carrier designed to fit within the TV channels with minimal adjacent channel leakage. Multiple channels can be used within the same base station if required and if there is sufficient spectrum availability. If multiple channels are deployed there will typically be no signaling coordination between them, although their timing and hopping sequences could be coordinated.

The uplink could be based on multiple narrow channels allocated on a frequency division basis (see FIG. 3). Each channel could be 48 kHz wide and channel center frequencies may be separated by 48 kHz. The channels may be filtered using root raised cosine (with, for example, B=0.4). Channels may be transmitted on a TDD (time division duplex) burst basis to fit in with the downlink operation. A ramp-up and ramp-down process may be used to keep adjacent channel emissions to a minimum. This may be achieved using a simple linear ramp.

Reception starts by detecting the presence of a carrier and searching for the downlink synchronization burst. This is suitably a synchronization word consisting of 48 symbols of alternating 0 and 1 followed by a 32-bit synchronization word using concatenated codes. The codes may be Barker codes selected from one of 8 possible sequences. Sequences are preferably selected so that neighboring base stations use different codes, reducing the probability of interference between them. The total burst may last 2.56 ms and enable terminals to lock to the carrier and the basic timing of the burst. They are then able to decode the frame configuration header which provides a range of information such as the base station identity and channel map (as described above). Terminals with no pre-knowledge of channels will search all available whitespace channels until they find a carrier. Terminals that have previously acquired a carrier may be able to determine the expected location of the carrier or a subset of possible carriers and reduce their search accordingly.

Spreading may be used in order to extend the range (at the expense of data rates). A wide range of spreading factors is available to tailor the data rate to the propagation conditions.

Spreading codes also provide an additional tool to overcome the absence of frequency planning between base stations. Neighboring base stations may be allocated different subsets of the same codes such that when they do transmit on the same frequency there is still some possibility for the terminals to decode the signal intended for them. The worst interference is likely to occur at a cell edge where the interfering signal can be almost as strong as the wanted signal. At a cell edge it is likely that the SNR will be low. Therefore, the base station may be configured to select a higher spreading factor for communications with terminals it determines to be located near the cell boundary. This makes it possible to make use of code diversity.

Spreading codes could be applied on a TDMA basis with different codes being applied to each terminal according to its SNR. The selection of spreading code is made by the base station according to channel quality information returned from the terminal.

The spreading codes are of length $2^N-1$ and are defined as follows:

| Spreading factor | Code type | Number of codes |
| --- | --- | --- |
| 15 | Kasami | 4 |
| 31 | Gold | 32 |
| 63 | Gold | 64 |
| 127 | Gold | 128 |
| 255 | Kasami | 16 |
| 511 | Gold | 512 |
| 1023 | Gold | 1024 |

These code sets have very good auto-correlation and cross-correlation properties, making them suitable for use with channels that have severe multipath and for use with multi-code spreading to convey multiple bits per symbol. As shown in the table above, there are fewer such codes for Kasami code sets than for Gold code sets, but the Gold codes are not available for all spreading factors.

The spreading factor used by a base station depends on the required processing gain to provide the necessary range for that cell. Some control fields within the MAC frame are preferably sent with the maximum spreading factor to ensure that all terminals can receive the control information (as discussed above). However, it is inefficient for a base station to use a spreading factor that is unnecessarily high and, therefore, for other portions of the frame the base station preferably selects a spreading factor that is tailored to the reception capabilities of the particular terminal(s) for whom that portion of the frame is intended.

The data may be initially encoded using BPSK (using 1 bit per symbol) or QPSK (using 2 bits per symbol). The selected spreading code may be applied separately to the I and Q components of each symbol. BPSK can be used to provide some extra processing gain when operating at the maximum supported spreading factor, in preference to doubling the spreading factor. In other cases, better performance may be achieved by using QPSK with a spreading factor that is twice as large to achieve the same overall data rate.

The base station may opt to use multiple codes rather than just a single code. For multi-code spreading there are an additional n bits per symbol encoded using a 1 in $2^n$ code selection from the available codes, in addition to the 2 encoded bits per symbol for the QPSK constellation. The selected codes may be used to separately modulate the I and Q data, as before.

The use of multiple codes to convey additional bits per symbol improves the $E_b/N_0$ performance of the modulation. Effectively, it is a form of coding. The improvement may be diluted by the addition of FEC (forward error correction coding) because the coding gain of FEC is lower for multi-code modulation (because the underlying modulation is already more efficient). Nonetheless, there are significant $E_b/N_0$ benefits in using a 1 in 4 code selection, such that a total of 4 bits are transmitted per symbol including the 2 bits for the QPSK modulation. It also allows the use of larger spreading factors for a given data rate, which improves the performance of a Rake receiver by allowing the length of the spreading codes to exceed the delay of all significant multipath components. The drawback is that multiple correlators are required in the receiver, but for a 1 in 4 code selection this is not a big overhead given that chip timing is known at this stage of the decoding process.

Carrier phase tracking may be required, likewise a Rake receiver and Rake finger tracking (i.e. channel impulse response tracking). This means that it can be suitable for use with channels that are varying a rate that is less than roughly $1/10^{th}$ of the symbol rate.

The spreading gain in the transmission could be used in order to be able to receive a signal in poor SNR conditions. This method also benefits from Rake equalization as widely used in CDMA systems such as 3G. Rake reception convolves the received signal with the spreading code to determine the timing, phase and magnitude of each path. The receiver can use this knowledge to construct an equalizer.

Further range extension may be provided for situations in which the SNR is extremely low. This might be suitable, for example, for reading energy meters located in basements or remote dwellings.

The simple modulation scheme NC OFK could be used. Under this modulation scheme the receiver does not need to maintain carrier lock, but simply looks at the difference between consecutive symbols (rather than their absolute values). This allows operation at very low SNR levels, albeit at relatively low data rates and with some penalties in BER as a result of the use of differential coding.

Making use of spreading codes to extend the range at the expense of data rate allows the possibility of neighboring cells using orthogonal spreading codes, such that if inter-cell interference occurs on one or more frequencies it may still be possible for some information to be received by the terminals. For simplicity, all base stations may make use of the same code sequences but with different offsets. The assignment of the offset is preferably made such that neighboring base stations have assignments that provide the maximum orthogonality. In this way code planning does not change according to assigned frequencies and so only needs to be altered when new base stations are added to the network. For example, if the terminal is operating at a spreading factor of 63, then there are 64 available offsets, of which each base station will typically use a subset of 4 (assuming a 1 in 4 code selection is being used to convey 2 bits per symbol). Therefore, in this example, different code subsets can be allocated to up to 16 neighboring base stations.

An alternative approach is to use different chip-rate scrambling sequences for each base station. This approach may result in a lower level of interference suppression than selecting different code subsets from the available Gold codes, because the Gold codes have optimum cross-correlation properties.

Figure 1:
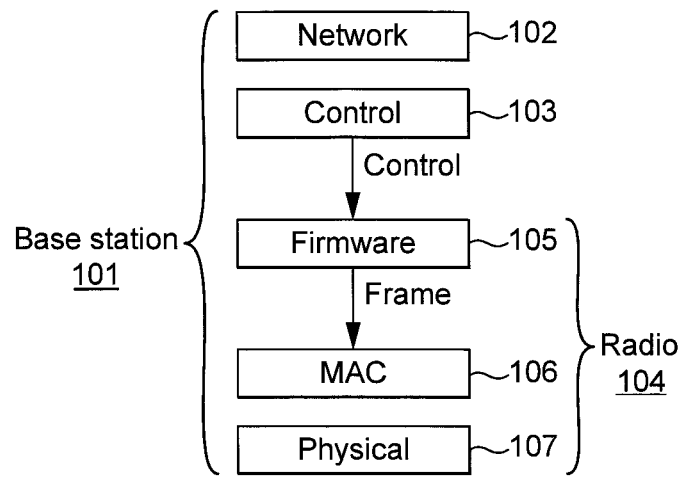
FIG. 1 shows the structure of a pre-existing base station.

The apparatus shown in FIGS. 1 and 2 are shown illustratively as comprising a number of interconnected functional blocks. This is for illustrative purposes and is not intended to define a strict division between different parts of hardware on a chip. In practice, the controller is preferably implemented by a microprocessor acting under software control (e.g. a virtual machine). In some embodiments, the algorithms may be performed wholly or partly in hardware.

The controller and the radio may be implemented as physically separate pieces of apparatus connected by a wired or wireless connection. However, the controller and the radio may be implemented by a single piece of apparatus. The controller and the radio may be implemented by separate pieces of equipment contained in the same housing.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicants indicate that aspects of the present invention may consist of any such feature or combination of features. In view of the foregoing description it will be evident to a person skilled in the art that various modifications may be made within the scope of the invention.

What is claimed is:

1. A controller, implemented as a virtual machine, configured to control a radio that transmits and receives data over a communication network, the controller further being configured to:
    format data to be transmitted over the communication network in response to data received by the radio;
    transfer the formatted data to a radio for transmission over the network; and
    control the radio for there to be a delay of at least one second between data being received over the network by the radio and the radio having to transmit a response to that data.

2. A controller as claimed in claim 1, configured to format the data into a series of frames in which each frame has the same duration.

3. A controller as claimed in claim 1, configured to format the data into a series of frames in which the duration of each frame is at least one second.

4. A controller as claimed in claim 1, configured to format the data into a series of frames that each have a duration of 2 seconds.

5. A controller as claimed in claim 1, configured to control the radio such that it communicates at least one frame between receiving the data and transmitting the response.

6. A controller as claimed in in claim 1, configured to control the radio in accordance with a protocol for machine-to-machine communications.

7. A controller as claimed in claim 6, configured to control the radio in accordance with the Weightless protocol.

8. A controller as claimed in claim 1, implemented on a PC.

9. A controller as claimed in claim 1, implemented in a .NET Framework.

10. A controller as claimed in claim 1, configured to transfer data received over the network by the radio to a computing cloud for processing.

11. A controller as claimed in claim 10, configured to receive a response to the received data from the computing cloud and format that response into data to be transmitted over the network by the radio.

12. A controller as claimed in claim 1, configured to format data to be transmitted over the network into a series of frames in which each frame comprises:
    a downlink portion for transmissions by radio, said downlink portion comprising a control portion; and
    an uplink portion for transmissions to the radio.

13. A controller as claimed in claim 12, configured to control the radio to transmit the control portion of each frame using a relatively low data rate so as to maximise the likelihood of the control portion being successfully received by a terminal operating in the communication network.

14. A controller as claimed in claim 12, configured to control the radio to transmit the control portion using the lowest data rate supported by a base station in which the controller is configured to operate.

15. A controller as claimed in claim 12, configured to communicate with a plurality of terminals via the radio and to control the radio to transmit the control portion of each frame using the lowest data rate required by the plurality of terminals.

16. A controller as claimed in claim 15, configured to control the radio to transmit the control portion using the lowest data rate required by all terminals connected to a cell with which the radio is associated.

17. The controller as claimed in claim 1 configured to format data to be transmitted over the communication network in response to the data received by the radio into a series of frames, and communicate the series of frames at a frame rate that is sufficiently low to for there to be the delay of at least one second.

18. The controller as claimed in claim 1 configured to format data to be transmitted over the communication network in response to the data received by the radio into a series of frames, and communicate the series of frames at a frame rate no higher than one frame per second so that there is the delay of at least one second.

19. A base station controller configured to control a base station of a communication network, the base station controller comprising a controller as claimed in claim 1.

20. A tangible, non-transitory computer-readable medium encoded with instructions, that when executed by a controller configured to control a radio that transmits and receives data over a communication network, cause the controller to:
    format data to be transmitted over the communication network in response to data received by the radio;
    transfer the formatted data to the radio for transmission over the network; and
    control the radio for there to be a delay of at least one second between data being received over the network by the radio and the radio having to transmit a response to that data.

* * * * *